(12) United States Patent
Smith et al.

(10) Patent No.: US 6,416,906 B1
(45) Date of Patent: Jul. 9, 2002

(54) STABILIZED LITHIUM ELECTROCHEMICAL CELLS CONTAINING AN ALKOXY SILANE

(75) Inventors: W. Novis Smith; Joel McCloskey, both of Philadelphia, PA (US)

(73) Assignee: Lithdyne Internatioal Inc., Anaheim, CA (US)

( * ) Notice: Subject to any disclaimer, the term of this patent is extended or adjusted under 35 U.S.C. 154(b) by 0 days.

(21) Appl. No.: 09/478,173

(22) Filed: Jan. 5, 2000

(51) Int. Cl.[7] ............................................. H01M 6/18
(52) U.S. Cl. ...................... 429/304; 429/303; 429/306; 429/307; 429/313; 429/321
(58) Field of Search ................................ 429/303, 304, 429/306, 307, 313, 321

(56) References Cited

U.S. PATENT DOCUMENTS 5,458,996 A * 10/1995 Itoh et al. .................... 429/196
6,114,070 A * 9/2000 Yoshida et al. ............. 429/332

FOREIGN PATENT DOCUMENTS

JP          08321311 A2 * 12/1996

* cited by examiner

*Primary Examiner*—Carol Chaney
*Assistant Examiner*—Dah-Wei D. Yuan
(74) *Attorney, Agent, or Firm*—John Lezdey & Assoc.

(57) ABSTRACT

The inventory provides an electrolyte containing silane additive for the lithium-containing electrochemical cells and batteries.

10 Claims, No Drawings

STABILIZED LITHIUM ELECTROCHEMICAL CELLS CONTAINING AN ALKOXY SILANE

1. FIELD OF THE INVENTION

This invention relates to the performance improvements of lithium electrochemical cells and batteries. More particularly, the invention pertains to an improved electrolyte containing a siloxane additive for lithium-containing electrochemical cells and batteries.

2. DESCRIPTION OF THE PRIOR ART

Lithium battery structures are prepared from one or more lithium electrochemical cells. Such cells include an anode, a cathode and an electrolyte interposed between electrically insulated spaced apart positive and negative electrodes. The electrolyte typically comprises a salt of lithium dissolved in one or more solvents, such as nonaqueous aprotic organic solvents. Lithium metal is a preferred anode material for batteries, having superior thermodynamic and kinetic characteristics. Lithium is a good conductor of electricity and heat. Lithium metal is soft and malleable and can be readily extruded into thin sheets. However, it is well known that lithium is reactive with water and other reagents.

The anode includes a current collector, typically of nickel, iron, stainless steel and/or copper foil. The cathode also includes a current collector typically of aluminum, nickel, iron, stainless steel and/or copper foil. Commercially available lithium cells with a pure lithium anode are presently available only as primary cells for the reason of its activity.

Several disadvantages which occur as a result of this reactivity, namely, exothermic reactions and the formation of a passivating film on the anode surface. Liberation of heat from the exothermic reaction, could under some circumstances lead to an explosive release of energy. When primary lithium batteries are subjected to temperatures above recommended levels, exothermic reactions result with the liberation of intense heat.

Rechargeable or secondary cells are more desirable than primary (nonrechargeable)cells since the associated chemical reactions, which take place at the positive and negative electrodes of the battery are reversible. Electrodes for secondary cells are capable of being recharged by the application of an electrical charge thereto. Numerous advanced electrode systems have been developed for storing electrical charge. Concurrently much effort has been dedicated to the development of electrolytes capable of enhancing the capabilities and performance of electro-chemical cells. The most practical electrolytes from the standpoint of functionality, reasonable cost, and ease of handling are organic solutions containing lithium ion salts. Liquid electrolytes while demonstrating receptable ionic conductivity must be free from as many impurities as possible which may affect cell performance.

Lithium ion batteries employ non-aqueous electrolytes Comprising such salts as $LiAsF_6$, $LiClO_4$, Lithium Triflate $LiBF_4$ or $LiPF_6$ and solvent mixtures of ethylene carbonate, propylene carbonate, diethyl carbonate and the like and must be free from as many impurities as possible which may affect cell performance. More particularly, the rechargeability of a lithium ion electrode is limited by side reactions of the lithium ion and auto-catalytic reaction within the cell, as disclosed is U.S. Pat. No. 5,830,600 issued to Norang, et al, which is herein incorporated by reference. The lithium ion electrode is limited by side reactions between metallic lithium and impurities, such as acids and water. The water may be present initially or generated in situ. The acids may also be formed in situ by the reaction of water with the components of the electrolyte. When such impurities react with the lithium ion anode there is formed a solid surface layer on the lithium ion anode which increases the impedance of the anode.

Undesired reactions between impurities in electrochemical cells and cell components have essentially formed upon reactivity at the anode. U.S. Pat. No. 5,419,985 issued to Kokshang describes the effect of impurities on the lithium ion anode and the lithium metal anode when water reacts with lithium to form a solid surface layer of high impedance. A lithium ion battery which uses graphite or carbon as negative electrode is also subject to passivation at the carbon electrode by undesired reaction caused by the presence of impurities, especially water and acids.

Liquid electrolytes while demonstrating acceptable ionic conductivity must be free from as many impurities as possible which may affect cell performance.

The problem of lithium reactivity toward the electrolyte has been addressed in various ways. One approach, as disclosed in U.S. Pat. No. 5,830,600, to reduce flammability and increase stability is to dissolve a lithium salt in a solvent such as a phosphate, a phospholene, a cyclophosphalene, a halogenated carbonate, a fluorinated polyether or a complex silane and mixtures thereof. These solvents provide nonflammable, self-extinguishing electrolytes for the lithium batteries. As solvents higher amounts of complex silane and siloxane compounds are required. These higher amounts, however, will cause loss of electrical performance particularly when used with a carbon dioxide generating compound as described in the patent.

Therefore, there is a need to provide more stable primary and secondary lithium batteries with respect to electrolyte performance and decomposition. Such batteries require an electrolyte that is chemically stable with respect to the lithium components and stop the corrosion of the metal current collectors such as aluminum and steel that occurs with certain lithium electrolytes.

This invention provides a selection of alkoxy silane compounds and a method for preventing decomposition of one or more lithium electrochemical cell components comprising a lithium ion anode or lithium ion anode or lithium metal anode, a lithium insertion compound cathode and a nonaqueous electrolyte. Incorporating a small amount of a low molecular weight alkoxy and/or dialkoxy silane to the nonaqueous electrolyte effectively overcomes the problem which arises between the interaction of the cell components and the water present. Such water reacts with the electrolyte which comprises a lithium salt in an organic solvent. This interaction between the salt and water results in the formation of acids. The method of adding select alkoxy silane compounds of this invention to the electrolyte effectively blocks the corrosive effect of the acids by forming reaction products which are relatively inert with respect to the function of the active material in the cell. Preferably the compounds are dissolved in the electrolyte. As a consequence of this reduced corrosion effect, the stability of primary batteries is enhanced and the capacity delivered from secondary batteries is improved even after extended recycling. Recharged or secondary batteries normally exhibit a loss in delivered capacity as a function of charge/discharge cycle. Another unexpected benefit imparted to lithium electrochemical cell by the alkoxy silane compositions of this invention is that it permits aluminum current collectors to be used with certain lithium electrolyte additives which would normally corrode aluminum collectors such as, lithium hexaphosphate, lithium tetrafluoroborate, lithium trifluorate inter alia.

The alkoxy silane compounds useful as additives according to the invention are of the general formula:

$$(R^1O)_n \, Si \, R_{4-n}$$

where $R^1$ is an alkyl group and R is selected from hydrogen, alkyl, alicyclic and aryl groups, where each of the $R^1$ and R constituents may be the same or different from each other, wherein the alkyl groups are straight or branched chains of less than ten carbon atoms and n may be an integer from 1 to 3. Particularly preferred compounds are trimethylethoxy silane, dimethyldiethoxy silane, methyltrimethoxy silane and dimethyldimithoxy silanes. based on the total weight of the electrolyte. These small are necessary to react selectively with small amounts of acid formed by trace amounts of impurities present on the anode, cathode or in the electrolyte. Also, the lower amounts do not interfere with the electrical properties of the electrolyte.

The mono and dialkoxysilane electrolyte additives of this invention are chemically compatible with the battery components. In other words, the alkoxysilanes are relatively inert with respect to the anode, cathode and components such as current collectors. It has been found that the alkoxysilane additive compounds can be used with lithium salt-based electrolytes which normally corrode aluminum collectors including lithium hexafluorophosphate and lithium hexaflourophosphate and lithium tetrafluoroborate, among others. The alkoxysilanes also prevent the discoloration of the electrolyte solutions. Such discoloration indicates the presence of acids due to organic solvent and interaction.

The small amounts of the alkoxysilanes additive compound which are incorporated in the electrolyte does not affect the bulk characteristics of the cell or battery. If the additive is dissolved in the electrolyte, it becomes easier to handle during manufacture and is more thoroughly dispersed throughout the cell. It should be noted that the use of too much additive compound can be detrimental to the thermal stability of such batteries and cells. An excessive amount of dissolved additive compound would be expected to adversely affect electrolyte conductivity and cyclability.

It is a primary object of the present invention to provide an improved lithium electrochemical cell or battery which has improved cycling characteristics and which maintains its integrity over a prolonged life cycle.

It is another object of the present invention to provide stabilized electrochemical cells which are stabilized against decomposition of cell components, including electrodes and electrolyte components.

An associated particular object of this invention is prevent color formation of side reactions which are primarily due to the reactions of acids with the organic solvents of the electrolyte.

It is a further object of this invention to provide an additive for use with an organic electrolyte which neutralizes with acid and/or water to form products which are relatively inert with respect to the active materials of a lithium electrochemical cell.

A more particular object of this invention is to provide a method which dissolve select alkoxy and dialkoxy silane compounds in critical amounts which substantially reduces or totally eliminates the corrosive interaction of the various components of a lithium electrochemical cell.

These and other objects, features and advantages will become apparent from the following description of the preferred embodiments and claims.

3. DETAILED DESCRIPTION OF THE PREFERRED EMBODIMENTS

According to this invention stabilized lithium electrochemical batteries and cells are protected by preventing the decomposition of one or more electrochemical cell components. The method of the invention effectively blocks the decomposition of a typical lithium electrochemical electrolyte comprising a lithium salt in a nonaqueous aprotic organic solvent. The decomposition which results from the interaction between the lithium salt and the water forming acids which is either initially present or generated in cells filled with these electrolytes. The trace amounts of acids formed by these interactions are treated by adding small amounts of low molecular weight alkoxy silanes. Although the exact chemical mechanisms involved are not known, it is theorized that a neutralization reaction occurs and produces inert hydrolysis products which do not interfere but can enhance the performance of the electrochemical cells. For example, some of the benefits of incorporating the additives of this invention include increasing the storage life and service life of the batteries and cells. The service life is increased because the cycling characteristics are prolonged without diminishing the cell's capacity. Also the effective temperature range is broadened.

The low molecular weight alkoxy silane additives which are relatively inexpensive and which may be easily included in the lithium salt based electrolyte composition of an electrochemical cell are of the general formula:

$$(R^1O)_n \, Si \, R_{4-n}$$

where $R^1$ is an alkyl group and R is selected from hydrogen, alkyl, alicyclic and aryl groups, where each of the $R^1$ and R constituents may be the same or different from each other, wherein the alkyl groups are straight or branched chains of less than ten carbon atoms and n may be an integer from 1 to 3. Particularly preferred compounds are trimethylethoxy silane and dimethyldiethoxy silane.

The low molecular weight alkoxy silanes are added in small amounts ranging from 0.01 to 3 weight percent based on the total weight of the electrolyte. These small amounts are necessary to react selectively with small amounts of acid formed by trace amounts of impurities present on the anode, cathode or in the electrolyte. Also, the lower amounts do not affect the viscosity or as mentioned above do not interfere with the electrical properties of the electrolyte.

The mono-, and di+ and alkoxysilane electrolyte additives of this invention are chemically compatible with the battery components. In other words, the alkoxysilanes are relatively inert with respect to the anode, cathode and components such as current collectors. It has been found that the alkoxysilane additive compounds can be used with lithium salt based electrolytes which normally corrode aluminum collectors including lithium hexafluorophosphate and lithium tetrafluoroborate, among others. The alkoxysilanes also prevent the discoloration of the electrolyte solutions. Such discoloration indicates the presence of acids due to organic solvent acid interaction.

The small amounts of the alkoxysilane additive compound which are incorporated in the electrolyte does not affect the bulk characteristics of the cell or battery. If the additive is dissolved in the electrolyte, it becomes easier to handle during manufacture and is more thoroughly dispersed throughout the cell. It should be noted that the use of too much additive compound can be detrimental to the thermal stability of such batteries and cells. An excessive amount of dissolved additive compound could be expected to adversely affect electrolyte conductivity and cyclability.

Much higher amounts of the complex silane and siloxane compositions are required when these compositions are used as electrolyte solvents as disclosed in U.S. Pat. No. 5,830,600.

The term "lithium salt", according to this includes compounds of this formula:

Li AN wherein AN is an anion which is selected from Cl$^-$, CF$_3$, SO$_3$ ClO$_4^-$, BF$_4^-$, Br$^-$, I$^-$, SCN$^-$, AsF$_6^-$, N(CF$_3$ SO$_2$)$_2)^-$, PF$_6^-$, SbF$_6^-$, O$^-$(CO)R$^4$, and wherein R" is selected from alkyl, aryl, alkanyl, haloalkyl, inter alia. Preferred lithium compounds include LiPF$_6$, LiAsF$_6$ LiBF$_4$ or LiCLO$_4$.

Organic solvents for use in lithium ion batteries include but not are limited to ethylene carbonate, propylene carbonate, dimethyl carbonate, dipropyl carbonate, dimethylsulfoxide, dimethoxyethane, tetrahydrofuran, N-methyl-2-pyrrolidone and mixtures thereof. In a preferred embodiment dimethyl carbonate comprises at least about 50% of the solvent. One preferred binary solvent system comprises ethylene carbonate/dimethylcarbonate.

Organic or inorganic thickening agents such as synthetic organic polymers, silicone dioxide and aluminum oxide may be used in order to modify liquid electrolyte solutions to form gel and solid states. The electrolyte system may be dispersed in a polymer gel structure. The polymer gel structure may consist of one or more different polymers.

Suitable polymers may be selected from polyethylene, polypropylene,polytetrafluoroethylene, polyethyleneterephthalate, polystrene, nylon, polyvinylidene fluoride, polyurethane, polyethylene oxide, polyacrylonitrile, polymethylacrylate, polyacrylamide,polyvinylacetate, poplyvinylphrrolidone, polytetraethylene glycol diacrylate, copolymers of any of the afore-mentioned, and combinations thereof.

It is possible that a pacification film is initially formed, i.e., an electrolyte interface between the anode and the electrolyte which enhances the stability of the primary batteries and extending the cycle life of the batteries.

It is understood "that the term lithium ion batteries include lithium/carbon anodes and cathodes.

The following example is presented as illustrative of the advantages of the invention method and demonstrate how electrolytes for specific lithium batteries and cells can be successfully prepared.

EXAMPLE 1

A one molar solution of (14%) was made using 1:1 ethylene carbonate/dimethyl carbonate and analyzed for water using a Karl Fisher Titration. (All material handling was performed under inert atmosphere.) Into each of eight identical Teflon (FEP) bottles were added 0.25% by weight of each additive to be evaluated. The solutions were shaken and analyzed 24 hours later. The solutions were analyzed 28 days and 60 days later to to determine the effect of the additive in maintaining a low acid and low color level in the electrolyte. The results are shown in the accompanying table. (Note that alkyl siloxanes react with base above pH of 3 therefore the indicator bromophenol was used) to analyze the remaining acid present.

COMPARATIVE EXAMPLE 2

Following the procedure of Example 1, a 1.0 molar solution of was made up of LiClO$_4$ 1:1 ethylene carbonate/ dimethyl carbonate. This solvent was analyzed for acid by base titration using bromophenol blue as an indicator. (Bromothymol blue indicator can not be used since it changes color only after the silane additive has been hydrolyzed in an acid filtration.)

The acid is calculated as ppm HF. Water was determined by Karl Fisher titration. 100-ml aliquots of this solution were placed in individual 250 ml FEP bottles under argon. To each bottle was added tetramethoxysilane. No additive was added to one of the bottles was taken as the normal level or standard without the use o additives of this invention.

After 24 hours all solutions was analyzed of ppm HF and ppm water. The solutions were again analyzed after 30 days. The color was also noted since it is indicative of acid-catalyzed deleterious side reactions occurring in the solvent. Note that at least two aryl or alkyl group must be on the silicon atom. In other words, tetramethoxy silane did not appear to work. Only R$_{4-n}$Si (OR')$_n$ silane compounds work where n=1, 2, or 3. Cyclic silanes will also work where there is at least one carbon bond to each silicon and at least one oxygen bond to each silicon. These results show that without the silane additives of this invention, the color increases as does the acid content of the electrolyte solution. The preferred silane additives initially reduce the acid content and hold it at a given value.

TABLE

Stability of 1 Molar LiPF$_6$ in 1:1 Ethylene Carbonate/Dimethyl Carbonate Solution
HF in ppm/Color

| Additive | Start | 24 hours | 21 days | 60 days |
| --- | --- | --- | --- | --- |
| None | 55 | 57 | 93 | 179 |
|  | colorless | colorless | yellow | amber |
| Trimethylethoxy silane | 55 | 38 | 18 | 29 |
|  | colorless | colorless | colorless | colorless |
| Dimethydiethoxy silane | 55 | 50 | 56 | 34 |
|  | colorless | colorless | colorless | colorless |
| Dimethyldimethoxy silane | 55 | 45 | 37 | 23 |
|  | colorless | colorless | colorless | colorless |
| Methyltrimethoxy silane | 55 | 50 | 60 | 70 |
|  | colorless | colorless | colorless | colorless |
| Tetramethoxy silane | 55 | 100 | 400 | 570 |
|  | colorless | colorless | dark yellow | dark amber |

What is claimed is:

1. In a nonaqueous electrolyte for a rechargeable battery comprising a lithium salt dissolved in an organic solvent the improvement which comprises including from about 0.01 to 5 weight percent of an alkoxy silane having the general formula:

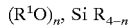

(R$^1$O)$_n$, Si R$_{4-n}$ where R$^1$ is an alkyl group, and R is selected from hydrogen, alkyl, alicyclic and aryl groups, where each R$_1$ and R may be the same or different form each other, wherein the alkyl groups are straight or branched chains of less than 10 carbon atoms and n may be an integer from 1 to 3.

2. The electrolyte according to claim 1 herein said silane is selected from the group consisting of trimethylethoxy silane, dimethyldiethoxy silane, methyltrimethoxy silane and dimethyl dimethoxy silane.

3. The electrolyte according to claim 1 wherein said organic solvent comprises at least one organic carbonate.

4. The electrolyte according to claim 3 wherein said organic carbonate is selected from the group consisting of ethylene carbonate, dimethyl carbonate, propylene carbonate, diethyl carbonate, ethyl methyl carbonate and mixtures thereof.

5. The electrolyte according to claim 4 wherein said organic carbonate is a mixture of equal parts by volume of ethylene carbonate and dimethyl carbonate.

6. The electrolyte according to claim 1 wherein said electrolyte solution includes a lithium salt selected from the group consisting of $LiPF_6$, LiSCN, $LiASF_6$, $LiClO_4$, $LiBF_4$, $LiN(CF_3SO_2)_2$, $LiCF_3SO_3$, $LiSbF_6$ and mixtures thereof.

7. The electrolyte according to claim 6 wherein the lithium salt is $LiPF_6$.

8. An electrochemical cell which comprises the electrolyte of claim 1.

9. A nonaqueous rechargeable lithium ion battery which comprise electrolyte of claim 1.

10. A rechargeable cell, which comprises the electrolyte of claim 1 wherein alkoxy silane dissolved in said electrolyte is about 0.25 weight percent based on the total weight of the electrolyte.

* * * * *